June 26, 1951    A. P. WITHALL    2,558,116
FRICTION SHOCK ABSORBER
Filed June 23, 1948    2 Sheets-Sheet 1

Inventor:
Albert P. Withall.
By Henry Fuchs
Atty.

June 26, 1951     A. P. WITHALL     2,558,116
FRICTION SHOCK ABSORBER

Filed June 23, 1948     2 Sheets-Sheet 2

Inventor:
Albert P. Withall.
By Henry Fuchs
Atty.

Patented June 26, 1951

2,558,116

UNITED STATES PATENT OFFICE 2,558,116

FRICTION SHOCK ABSORBER

Albert P. Withall, Chicago, Ill., assignor to W. H. Miner, Inc., Chicago, Ill., a corporation of Delaware Application June 23, 1948, Serial No. 34,672

5 Claims. (Cl. 267—9)

This invention relates to improvements in friction shock absorbers.

One object of the invention is to provide a friction shock absorber, especially adapted for snubbing the action of railway car truck springs, comprising a pair of relatively lengthwise slidable friction elements and a spring surrounding said elements, opposing relative lengthwise movement of the same toward each other, and pressing the same laterally against each other into frictional contact, wherein guide means is provided for preventing lateral tilting or displacement of the friction elements with respect to each other.

Another object of the invention it to provide a shock absorber as set forth in the preceding paragraph, wherein the guide means comprises a fixed guide lug associated with each friction element and spaced laterally therefrom to accommodate the other friction element for sliding movement therebetween, each guide lug and cooperating friction element having interengaging faces of tongue and groove formation for holding the friction elements against lateral displacement with respect to each other.

Other objects of the invention will more clearly appear from the description and claims hereinafter following.

Figure 1:
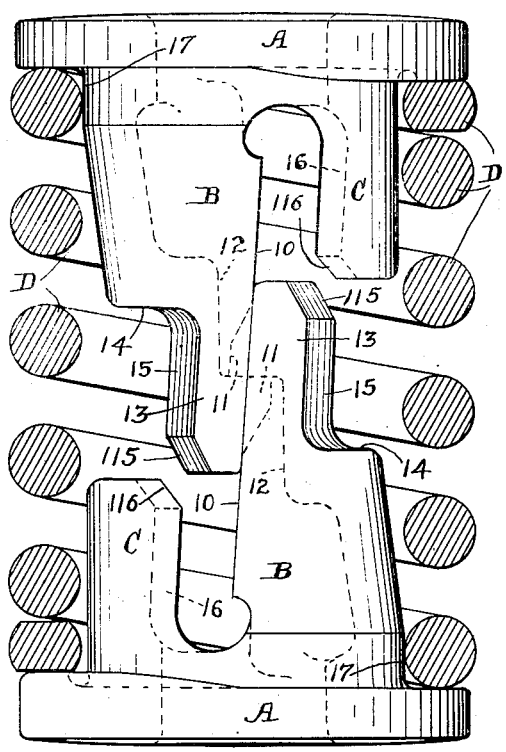
Figure 2:
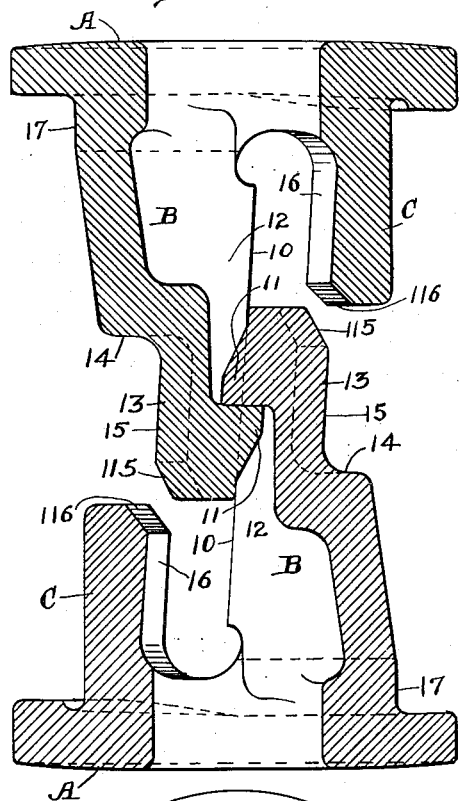
Figure 3:
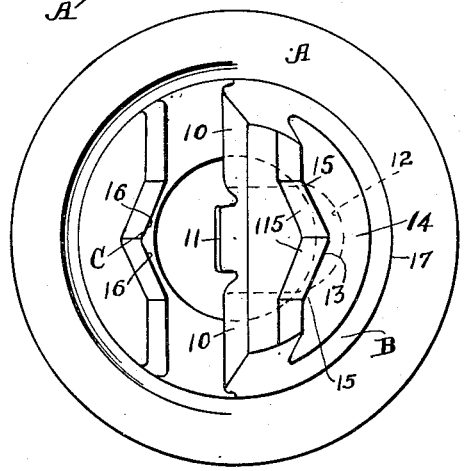
Figure 4:
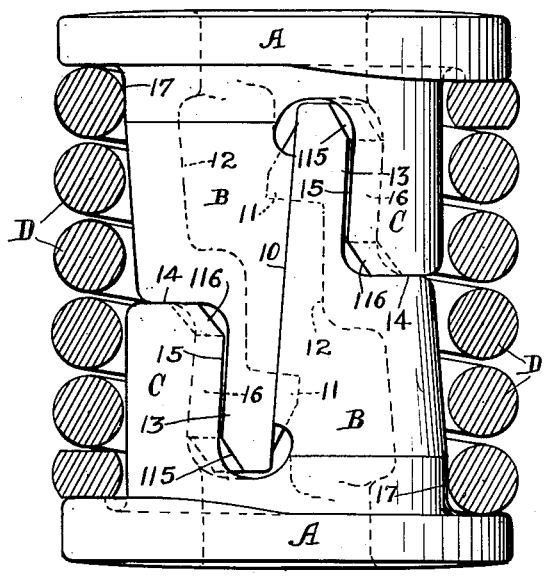
Figure 6:
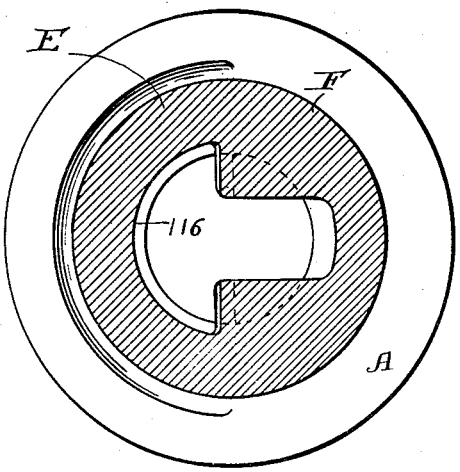
Figure 5:
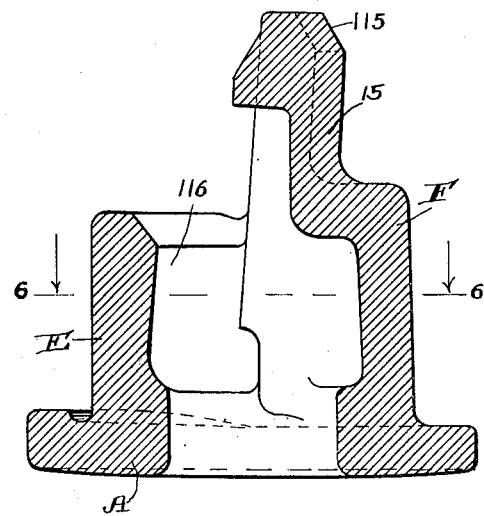

In the accompanying drawings forming a part of this specification, Figure 1 is a side elevational view of my improved shock absorber, illustrating the spring in vertical section. Figure 2 is a transverse vertical sectional view of Figure 1, taken on a plane normal to the friction surfaces of the friction members, with the spring omitted. Figure 3 is a top plan view of the bottom friction member shown in Figure 2. Figure 4 is a view similar to Figure 1, showing the shock absorber closed. Figure 5 is a transverse vertical sectional view, similar to Figure 2, of the lower friction member, illustrating another embodiment of the invention. Figure 6 is a horizontal sectional view, corresponding substantially to the line 6—6 of Figure 5.

Referring first to the embodiment of the invention illustrated in Figures 1 to 4 inclusive, the improved shock absorber comprises broadly top and bottom followers A—A, cooperating top and bottom friction posts B—B extending from the followers, guide lugs C—C on the followers for holding the friction posts against relative lateral displacement, and a spring resistance D, yieldingly opposing relative lengthwise movement of the posts and forcing the same into frictional contact with each other.

The top and bottom posts B—B are identical, being formed integral with the top and bottom followers A—A, respectively, the followers A—A being in the form of flanges at the base portions of the posts. The two posts B—B are reversely arranged, that is, the top post B is inverted with respect to the bottom post B. As shown most clearly in Figures 1 and 2, the follower A of the lower post B is located at the bottom of the device and has the post upstanding therefrom, while the follower A of the upper post B is located at the upper end of the device and has the post depending therefrom.

Each post B presents a flat friction surface 10 on the inner side thereof, which extends lengthwise of the same. The friction surfaces 10—10 of the two posts are in intimate contact with each other, as clearly illustrated in Figures 1, 2, and 4. The two posts have laterally inwardly projecting stop lugs 11—11 at their outer ends, which cooperate to limit lengthwise separation of the posts. Inwardly of the lugs 11 of each post, the inner surface of the latter is cut out, or longitudinally grooved, as indicated at 12, to accommodate the lug 11 of the other post. The outer end of each post, that is, the end portion thereof which is provided with the lug 11, is of reduced thickness, as indicated at 13, thus providing a transverse stop shoulder 14, adapted to be engaged by the outer end of the guide lug C of the other post to limit longitudinal inward movement of the posts. The outer surface 15 of the reduced portion of each post is of V-shaped, transverse cross section.

The guide lugs C—C are formed integral with the respective followers. The lug C of each follower is spaced laterally from and opposed to the post B of said follower, being diametrically opposite to said post. The space between the latter and the lug form a guideway adapted to accommodate the reduced end 13 of the other post, the longitudinal inner surface of the lug, which inner surface is indicated by 16, being of V-shaped, transverse cross section to fit the V-shaped surface 15 of the cooperating post. The outer end of each post B and the outer end of each cooperating lug are preferably beveled, as indicated respectively at 115 and 116, to facilitate entrance of the post into the corresponding guideway.

The spring resistance D is in the form of a heavy helical coil surrounding the posts B—B and bears at its top and bottom ends on the followers A—A, respectively. The interior diameter of the coiled spring D and the spread of the contacting friction posts B—B is such that the inner sides of the top and bottom coils of the spring bear laterally inwardly on the vertical side walls 17—17 of the posts, that is, the inner side of the coil at the lower end of the spring bears on the vertical wall 17 of the lower post B at the right hand side of the device, as seen in Figure 1, and the coil at the upper end of the spring bears on the wall 17 of the upper post B at the left hand side of the device, the spread of the posts being such that the lower end portion of the spring is displaced slightly to the right and the upper end slightly to the left. The posts are thus held in intimate contact along their friction surfaces by the spring D. In addition to pressing the posts together, the spring D yieldingly opposes relative movement of the followers A—A and the posts B—B thereof toward each other.

The improved shock absorber preferably replaces one or more of the spring units of a truck spring cluster, being interposed between the usual top and bottom spring plates which cooperate with the cluster.

The operation of my improved shock absorber is as follows: Upon the spring cluster of the truck of a railway car being compressed between the spring follower plates of the cluster, the shock absorber unit, which is disposed between said follower plates, is compressed therewith, thereby forcing the upper post B downwardly toward the lower post B against the resistance of the spring D. High frictional resistance is thus provided.

As shown in Figure 1, the outer ends of the posts B—B are normally slightly spaced from the cooperating guide lugs C—C. However, in actual service, the improved shock absorber is under initial compression, due to the weight of the car, thus positioning the outer ends of the posts B—B inwardly beyond the outer ends of the guide lugs C—C. As compression of the device progresses, the reduced ends 13—13 of the posts enter and travel along the guideways provided by the lugs C—C and the opposed friction surfaces of the posts. The posts are thus positively held against lateral displacement by the interengaging tongue and groove formation of the V-shaped surfaces 15 and 16 of the posts B—B and the lugs C—C. Compression of the device is finally limited by engagement of the lugs C—C with the stop shoulders 14—14 of the posts, as shown in Figure 4.

During the described relative lengthwise movement of the posts B—B on the friction surfaces 10—10, the required frictional resistance is developed to effectively snub the action of the truck springs. Upon release of the mechanism, the posts B—B are restored to the normal position shown in Figure 1 by the expansive action of the spring D, longitudinal separation of the posts being limited by engagement of the lugs 11—11 of the posts with each other.

Referring next to the embodiment of the invention illustrated in Figures 5 and 6, the construction is the same as that described in connection with Figures 1 to 4 inclusive, with the exception that the guide lug, which is indicated by E in Figures 5 and 6, which corresponds to the guide lug C, is formed integral with the corresponding post F and has a longitudinally extending, interior guide surface 116, which is transversely curved, and that the guide surface 115 of the post, which cooperates with the surface 116 of the guide lug of the other follower, is transversely curved to fit the surface 116.

I claim:

1. In a friction shock absorber, the combination with a pair of relatively lengthwise slidable friction posts having interengaging friction surfaces on their inner sides; of a guide member fixed with respect to each post and having a wall portion spaced laterally therefrom forming a guideway between said post and wall portion to accommodate the other post for sliding movement, said wall portion of said guide member and post having interengaging guide portions of tongue and groove formation for holding said post and lug against relative lateral displacement; and spring means yieldingly opposing relative lengthwise movement of said posts toward each other and pressing the posts into tight frictional contact with each other.

2. In a friction shock absorber, the combination with a pair of relatively lengthwise slidable friction posts having interengaging friction surfaces on their inner sides; of a guide lug fixed with respect to each post and spaced laterally therefrom forming a guide way between said post and lug to accommodate the other post for sliding movement, said lug and post having longitudinally extending, interengaging faces of V-shaped, transverse cross section for holding said post and lug against relative lateral displacement; and spring means yieldingly opposing relative lengthwise movement of said posts toward each other and pressing the posts into tight frictional contact with each other.

3. In a friction shock absorber, the combination with a pair of relatively lengthwise slidable friction posts having interengaging friction surfaces on their inner sides; of a guide member fixed with respect to each post and having a wall portion spaced laterally therefrom providing a guideway between said post and wall portion to accommodate the other post for sliding movement, said wall portion and post having longitudinally extending, interengaging faces of curved cross section for holding said post and guide member against relative lateral displacement; and spring means yieldingly opposing relative lengthwise movement of said posts toward each other and pressing the posts into tight frictional contact with each other.

4. In a friction shock absorber, the combination with top and bottom followers; of a top friction post depending from said top follower; a guide lug on said top follower depending therefrom and laterally spaced from said post; a bottom friction post upstanding from said bottom follower; a guide lug on said bottom follower upstanding therefrom and laterally spaced from said last named post, the lower end of said upper post being engageable with and guided between the post and lug of said lower follower, said lower end of the upper post and said lug having interengaging guide portions of tongue and groove formation, and the upper end of the lower post being engageable with and guided between the post and the lug of the upper follower, said upper end of said lower post and said lug of said upper follower having interengaging guide portions of tongue and groove formation; and spring means surrounding said posts and interposed between said top and bottom followers, said spring means having lateral bearing on said posts to force the same into tight frictional engagement with each other.

5. In a friction shock absorber, the combination with top and bottom followers; of a top friction post depending from said top follower; a guide lug on said top follower depending therefrom and laterally spaced from said post; a bottom friction post upstanding from said bottom follower; a guide lug on said bottom follower upstanding therefrom and laterally spaced from said last named post, the lower end of said upper post being engageable with and guided between the post and lug of said lower follower, said lower end of the upper post and said lug having interengaging guide portions of V-shaped, transverse cross section, and the upper end of said lower post being engageable with and guided between the post and lug of the upper follower, said upper end of said lower post and said lug of the upper follower having interengaging guide portions of V-shaped, transverse cross section; and spring means surrounding said posts and interposed between said top and bottom followers, said spring means having lateral bearing on said posts to force the same into tight frictional engagement with each other.

ALBERT P. WITHALL.

REFERENCES CITED

The following references are of record in the file of this patent:

UNITED STATES PATENTS

| Number | Name | Date |
| --- | --- | --- |
| 1,924,814 | Sproul | Aug. 29, 1933 |
| 2,366,918 | Light | Jan. 9, 1945 |
| 2,406,064 | Dath | Aug. 20, 1946 |
| 2,410,165 | Johnson et al. | Oct. 29, 1946 |
| 2,426,684 | Haseltine | Sept. 2, 1947 |